United States Patent
Dickinson et al.

(10) Patent No.: US 11,792,116 B1
(45) Date of Patent: *Oct. 17, 2023

(54) STATEFUL NETWORK ROUTER FOR MANAGING NETWORK APPLIANCES

(71) Applicant: Amazon Technologies, Inc., Seattle, WA (US)

(72) Inventors: Andrew Bruce Dickinson, Seattle, WA (US); Anoop Dawani, Kirkland, WA (US); Joseph Elmar Magerramov, Bellevue, WA (US); Nishant Mehta, Snoqualmie, WA (US); Lee Spencer Dillard, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/394,090

(22) Filed: Aug. 4, 2021

Related U.S. Application Data

(63) Continuation of application No. 16/366,256, filed on Mar. 27, 2019, now Pat. No. 11,115,322.

(51) Int. Cl.
| | |
|---|---|
| *H04L 45/00* | (2022.01) |
| *H04L 43/0817* | (2022.01) |
| *H04L 47/2483* | (2022.01) |
| *H04L 47/783* | (2022.01) |
| *H04L 45/02* | (2022.01) |
| *H04L 9/40* | (2022.01) |
| *H04L 45/302* | (2022.01) |
| *H04L 45/7453* | (2022.01) |

(52) U.S. Cl.
CPC .......... *H04L 45/38* (2013.01); *H04L 43/0817* (2013.01); *H04L 45/04* (2013.01); *H04L 45/306* (2013.01); *H04L 45/7453* (2013.01); *H04L 47/2483* (2013.01); *H04L 47/783* (2013.01); *H04L 63/0272* (2013.01)

(58) Field of Classification Search
None
See application file for complete search history.

(56) References Cited

U.S. PATENT DOCUMENTS

| | | | |
|---|---|---|---|
| 10,110,753 B1 | 10/2018 | Qureshi | |
| 11,115,322 B1 * | 9/2021 | Dickinson | H04L 43/0817 |
| 2013/0265875 A1 | 10/2013 | Dyke et al. | |
| 2016/0026514 A1 | 1/2016 | Cucinotta et al. | |
| 2016/0142314 A1 * | 5/2016 | Parsa | H04L 41/0893 370/235 |
| 2016/0191363 A1 * | 6/2016 | Haraszti | H04L 67/14 709/223 |
| 2018/0006880 A1 * | 1/2018 | Shakimov | H04L 67/563 |
| 2018/0063193 A1 | 3/2018 | Chandrashekhar et al. | |
| 2019/0306112 A1 * | 10/2019 | Augustyn | H04L 45/741 |
| 2020/0195558 A1 | 6/2020 | Schultz et al. | |
| 2022/0121467 A1 * | 4/2022 | Bonnal Conduzorgues | G06F 9/5077 |

\* cited by examiner

*Primary Examiner* — Lonnie V Sweet
(74) *Attorney, Agent, or Firm* — Thomas Horstemeyer, LLP

(57) ABSTRACT

Disclosed are various embodiments of a stateful network router. In one embodiment, a network data connection is intercepted between a first host and a second host on a network. First data packets from the network data connection sent by the first host to the second host are routed to a target network appliance. Second data packets from the network data connection sent by the second host to the first host are also to the target network appliance.

20 Claims, 7 Drawing Sheets

STATEFUL NETWORK ROUTER FOR MANAGING NETWORK APPLIANCES

CROSS-REFERENCE TO RELATED APPLICATIONS

This application is a continuation of, and claims priority to, U.S. patent application Ser. No. 16/366,256, entitled "STATEFUL NETWORK ROUTER FOR MANAGING NETWORK APPLIANCES," and filed on Mar. 27, 2019, which is incorporated herein by reference in its entirety.

BACKGROUND

Enterprise computer networks often include various network appliances. Conventional network appliances are physically and serially inserted in a network to perform management or monitoring functions. For example, a network appliance may have an external network interface and an internal network interface. One patch cable couples the external network interface to an external switch or router, while another patch cable couples the internal network interface to an internal switch or router. Network appliances may provide firewalling or filtering, logging, auditing, virus scanning, traffic analytics, or other functionality. Some network appliances may simply monitor and not alter network traffic, while others may modify or drop packets or connections. Some network appliances may be assigned network-layer addresses and may constitute a visible network hop, while other network appliances may operate transparently at the network layer and/or the data link layer.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
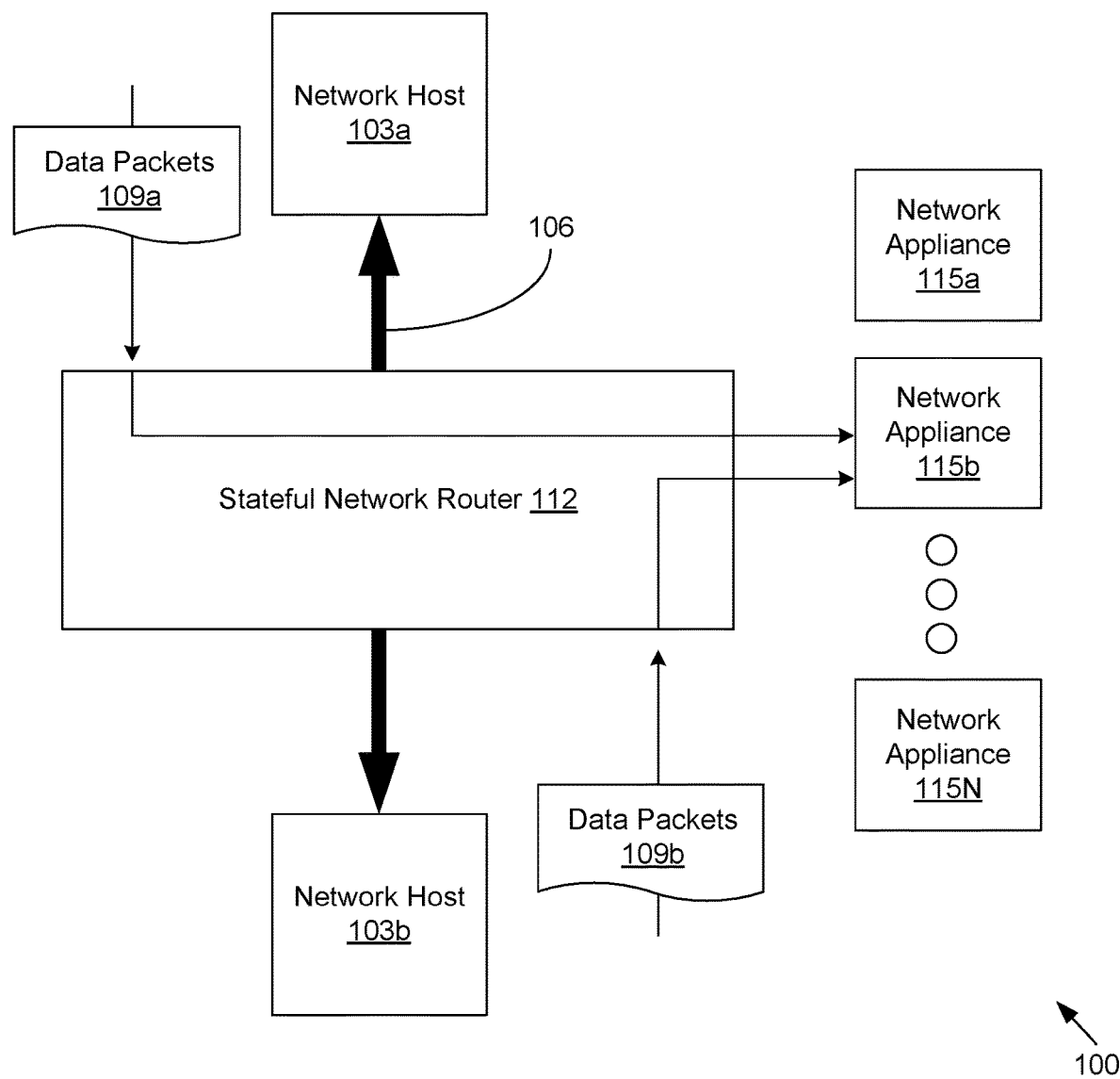
FIG. 1 is a drawing of an example networked environment according to various embodiments of the present disclosure.

The present disclosure relates to a stateful network router that may be used to route network traffic through one or more network appliances. Scaling capacity for network appliances has been difficult. A network appliance that is unable to keep up with a level of network traffic might be replaced with a higher capacity network appliance, but for some networks, a single network appliance with sufficient capacity may be unavailable or uneconomical. Also, switching between single network appliances may result in downtime.

Multiple network appliances may be deployed using an equal-cost multi-path (ECMP) routing approach, but this, too, has drawbacks. Flow hashing may be used to distribute network traffic approximately equally among a bank of multiple network appliances, but corresponding return traffic may be routed through a different network appliance. State replication may be employed among the network appliances in order to handle corresponding return traffic. State replication, however, is problematic for scaling and at present limits scaling beyond three or four network appliances.

Traditional load balancers are also not suited for use with network appliances. Load balancers approximately evenly distribute inbound traffic to multiple replicated network services, such as web servers. Load balancers are not transparent devices; instead, they typically use network address translation. This results in changed flow identifying parameters, such as source and destination network addresses and ports. Network appliances often rely on these parameters and may not function correctly when these parameters are changed. Also, a failure of a network appliance behind a load balancer would cause the failure of any connections in progress that had been routed through the failed network appliance.

Various embodiments of the present disclosure introduce a stateful network router that can route network traffic transparently to and from one or more network appliances. This allows for scaling of the network appliances to handle increased or decreased load as needed. Moreover, the network appliances may be dynamically deployed as a service under a utility computing model. With this approach, network appliances may be used in networks such as virtual private networks existing on utility computing infrastructure. In some embodiments, network traffic in a first network can be routed by way of a stateful network router for processing by a network appliance existing on a second network.

As one skilled in the art will appreciate in light of this disclosure, certain embodiments may be capable of achieving certain advantages, including some or all of the following: (1) reducing computer system memory requirements in network appliances and reducing network utilization by avoiding state replication among a bank of network appliances, (2) improving the functioning of the computer network by allowing for rerouting of connections previously routed to a network appliance that has failed rather than dropping the connections, (3) enhancing flexibility of a computer network by permitting dynamic deployment of network appliances executed on virtual machine instances via a utility computing model in lieu of manual deployment of proprietary hardware, (4) enhancing flexibility of a computer network by facilitating redirection of traffic from one network to a network appliance on another network for processing, and so forth. In the following discussion, a general description of the system and its components is provided, followed by a discussion of the operation of the same.

Turning now to FIG. 1, shown is one example of a networked environment 100. In the networked environment 100, network hosts 103a and 103b are in data communication with each other via a network 106. Network host 103a sends data packets 109a to the network host 103b, and network host 103b sends data packets 109b to the network host 103a. The data packets 109a, 109b may be internet protocol (IP) packets, transmission control protocol (TCP) segments, user datagram protocol (UDP) datagrams, and/or other types of packets. The data packets 109a, 109b may be sent over any TCP or UDP port.

A stateful network router 112 is coupled to the infrastructure for the network 106 and interposed between the network host 103a and the network host 103b. Subject to configurable rules, any traffic exchanged on the network 106 between the network host 103a and the network host 103b can be intercepted by the stateful network router 112. The stateful network router 112 routes data on the network 106 to and from a plurality of network appliances 115a, 115b . . . 115N such that the stateful network router 112 controls the routing and forwarding of inbound and outbound traffic for the network appliances 115.

The network appliances 115 may perform various functions, such as monitoring, firewalling, filtering, malware scanning, and so forth. In one example, the network appliances 115 may perform the same function and may be replicated as needed to achieve scaling based on traffic volume. In other examples, various network appliances 115 may perform different functions, and the stateful network router 112 may route network traffic through multiple network appliances 115 that perform different desired functions. In some implementations, multiple stateful network routers 112 may be deployed serially or in a stacked configuration, with each stateful network router 112 being configured to route traffic to and from different groupings of network appliances 115, where respective groupings perform different functions. The network appliances 115 may operate transparently in a "bump-in-the-wire" mode. Alternatively, the network appliances 115 may perform network address translation (NAT) if desired.

As illustrated in this non-limiting example, the stateful network router 112 routes the data packets 109a and the data packets 109b through the same network appliance 115b. The network appliance 115b may be selected through a flow hashing approach designed to approximately equally distribute network traffic among the network appliances 115 that perform a replicated function. Other approaches to selection may be used, including time-based selection approaches or selection approaches that monitor throughput data rate, processor load, connection quantities, and/or other metrics pertaining to the network appliances 115 and attempt to assign flows based at least in part on one or more of these metrics in an equitable manner.

The data packets 109a and the data packets 109b may correspond to a network data connection that is a bidirectional data flow, such as through a single TCP or UDP connection. In this event, the stateful network router 112 may be configured to ensure that a corresponding related and/or return data flow is routed through the same network appliance 115b as a corresponding forward data flow. Related data may include error messages, including Internet control message protocol (ICMP) messages. Such an approach to assignment may be required for the network appliance 115 to properly perform its processing functions, even if the other network appliances 115 can perform the same functions. As will be described, the stateful network router 112 may also maintain existing flow assignments to network appliances 115 after scaling up, and the stateful network router 112 may perform health checks on the network appliances 115, and if necessary, reroute flows to different network appliances 115 to avoid interrupting the flows.

Figure 2:
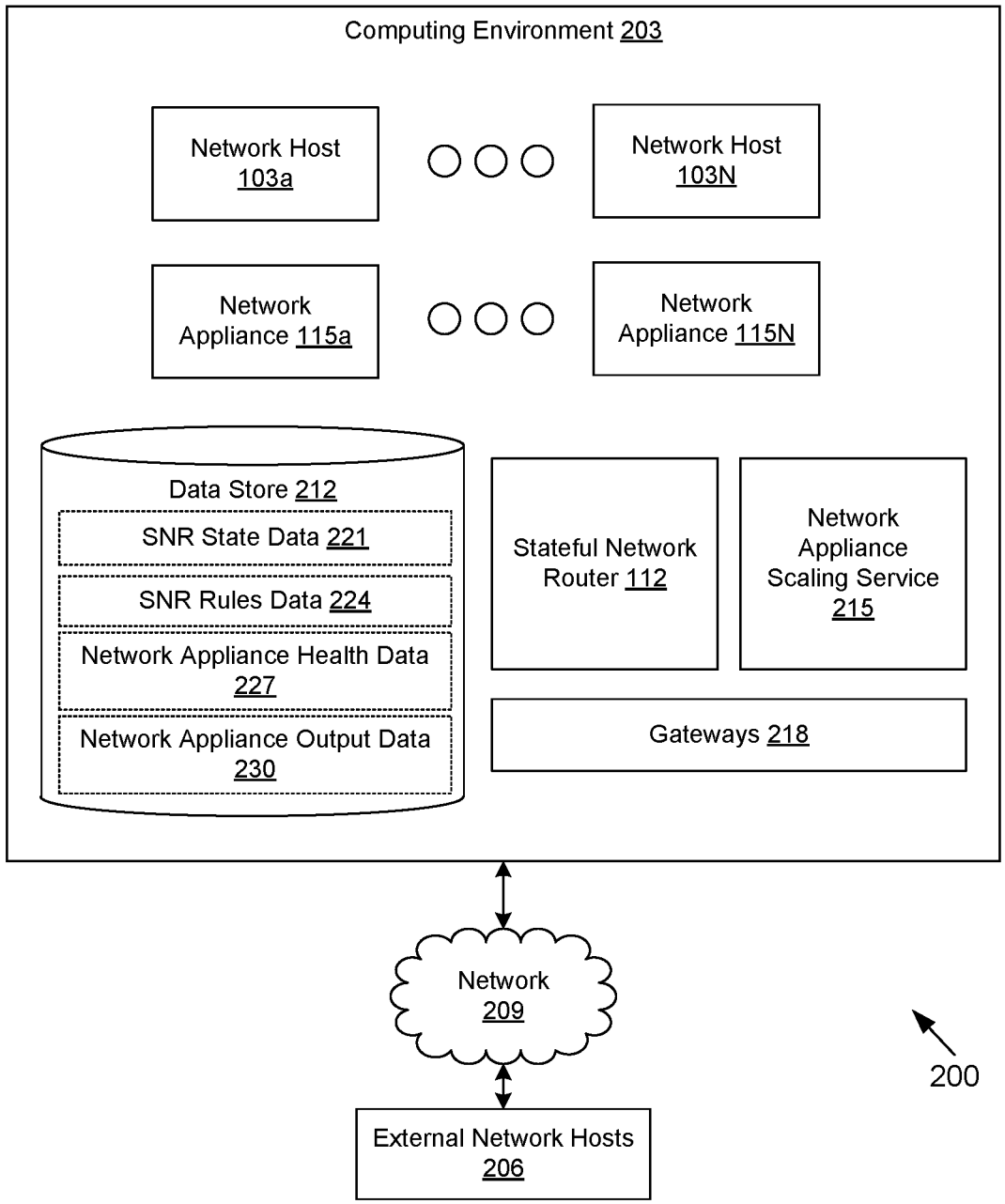
FIGS. 2 and 3 are schematic block diagrams of networked environments according to various embodiments of the present disclosure.

With reference to FIG. 2, shown is a networked environment 200 according to various embodiments. The networked environment 200 includes a computing environment 203 and external network hosts 206, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time. In one embodiment, the computing environment 203 corresponds to a virtual private network operated under a utility computing model on behalf of a customer with virtualized infrastructure.

The computing environment 203 may include various types of networking infrastructure to provide network connectivity to the respective components within the computing environment 203. Such networking infrastructure may include routers, switches, bridges, hubs, and a variety of physical links such as optical, twisted pair, coaxial, wireless, and so on. The networking infrastructure may employ data link layer protocols such as Ethernet, 802.11, token ring, etc., where respective components are assigned media access control (MAC) addresses. Internet protocol (IP) or other protocols may be used as a network layer protocol. The networking traffic within the computing environment 203 may be encrypted using internet protocol security (IPsec) or another approach and encapsulated using generic routing encapsulation (GRE) or another approach.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed in the computing environment 203, for example, include a plurality of network hosts 103a . . . 103N, a plurality of network appliances 115a . . . 115N, one or more stateful network routers 112, one or more network appliance scaling services 215, one or more gateways 218, and other applications, services, processes, systems, engines, or functionality not discussed in detail herein.

The network hosts 103 may correspond to network services such as web services, mail services, database services, media transcoding services, and/or other types of network services. Individual network hosts 103 may correspond to respective physical computing devices or virtualized machine instances executed on physical computing devices.

In some cases, multiple network hosts 103 may be executed on a single virtualized machine instance having multiple virtual network interfaces. Also, multiple virtualized machine instances may be executed on a single physical computing device, where the virtualized machine instances have separate virtual network interfaces.

The network appliances 115 may correspond to specialized physical computing devices or customized virtualized machine instances executed on physical computing devices that are configured to perform specific processing functions on network data. Each network appliance 115 may have a respective inbound network interface and a respective outbound network interface, such that data packets 109 (FIG. 1) are received via the inbound network interface, processed, and then forwarded via the outbound network interface. The processed data packets 109 may simply be repeated by the network appliance 115, or they may be modified in some way or even dropped and not forwarded via the outbound network interface. Because the network appliances 115 are surrounded by the stateful network router 112 that may guarantee that bidirectional and related flows are routed to the same network appliance 115, individual network appliances 115 do not need to obtain state information such as connection or flow state information from other network appliances 115.

The stateful network router 112 is executed to route network traffic to and from a target, such as a bank of network appliances 115. What network traffic is routed through the stateful network router 112 may be configured based on routing table rules. For example, all network traffic within the computing environment 203 may be routed through the stateful network router 112. Alternatively, selected portions of network traffic may be routed through the stateful network router 112 based on source address, destination address, source port, destination port, protocol, application layer data, and/or other criteria. The stateful network router 112 may transparently intercept traffic between network hosts 103 in the computing environment 203 or traffic between network hosts 103 and external network hosts 206 via a gateway 218. The stateful network router 112 may transparently intercept all traffic within a subnet or within multiple subnets.

In one embodiment, in order to assign network data flows to particular network appliances 115, the stateful network router 112 may perform flow-based hashing. As a non-limiting example, the stateful network router 112 may examine the identifying header information for the data packets 109 within a flow, potentially including source network address, destination network address, source port, destination port, and protocol type, and generate a hash value using a one-way hash function. The stateful network router 112 may then map the resulting hash value to a particular network appliance 115 so that the hash values are approximately evenly distributed among the network appliances 115 that perform a desired function. In generating the hash value, the stateful network router 112 may consider the source and destination data equivalently (e.g., by concatenating a lower value port to a higher value port rather than concatenating a source port to a destination port) so that the resulting hash value is the same when the source and destination are reversed. This achieves the desired result of assigning corresponding return flows to the same network appliance 115 as the forward flows.

In intercepting the traffic, the stateful network router 112 may maintain the same source and destination (e.g., source and destination network addresses and ports), and the stateful network router 112 may not show up as a network hop on a traceroute by not decrementing the time-to-live (TTL) field. In some cases, the stateful network router 112 may bridge data link layer traffic, thereby updating source and/or destination MAC addresses. In other cases, the MAC addresses are not modified. Even if the stateful network router 112 transparently intercepts the traffic, the network appliance 115 may be visible by modifying the data packets 109 or by performing NAT or port address translation (PAT).

The stateful network router 112 may periodically, or in response to an event, perform health checks upon the network appliances 115. In this regard, the stateful network router 112 may communicate with the network appliances 115 via simple network management protocol (SNMP) or another approach to query the state of the network appliances 115. Upon detection of a failure of a network appliance 115, the stateful network router 112 may reroute network traffic to a different network appliance 115 to avoid dropping a connection.

The network appliance scaling service 215 is executed to scale the quantity of the network appliances 115 up or down as needed to meet network traffic demands in the computing environment 203. To this end, the network appliance scaling service 215 may receive network utilization metrics from within the computing environment 203 and utilization information from the network appliances 115 to determine whether one or more network appliances 115 are unnecessary or if additional network appliances 115 should be deployed.

In scaling down, the network appliance scaling service 215 may terminate machine instances allocated to one or more network appliances 115 and/or reallocate network appliances 115 to other computing environments 203. In scaling up, the network appliance scaling service 215 may instantiate or launch new machine instances for new network appliances 115 or reallocate existing network appliances 115 to the computing environment 203. The scaling may be performed in response to user requests or automatically based upon the received metrics in combination with scaling rules and metric histories.

The gateways 218 are operable to route inbound traffic from the network 209 to respective entities within the computing environment 203 or outbound traffic from within the computing environment 203 to the network 209. The gateways 218 may perform NAT, for example, by transforming private network addresses to public network addresses. The gateways 218 may perform encryption and decryption as well as encapsulation and de-encapsulation functions.

The data stored in the data store 212 includes, for example, stateful network router state data 221, stateful network router rules data 224, network appliance health data 227, network appliance output data 230, and potentially other data. The stateful network router state data 221 tracks state information for network flows intercepted by the stateful network router 112. For example, the stateful network router state data 221 may record assignments of flows to particular network appliances 115. The stateful network router rules data 224 include rules that configure which network traffic within the computing environment 203 is routed to the stateful network router 112 for distribution to particular types of network appliances 115.

The network appliance health data 227 may include information about network appliance 115 health received by the stateful network router 112 as part of health checks. The network appliance output data 230 may include data generated by network appliances 115. Such data may include analytics data, logging data, malware detection data, firewall operations data, and/or other data.

Figure 3:
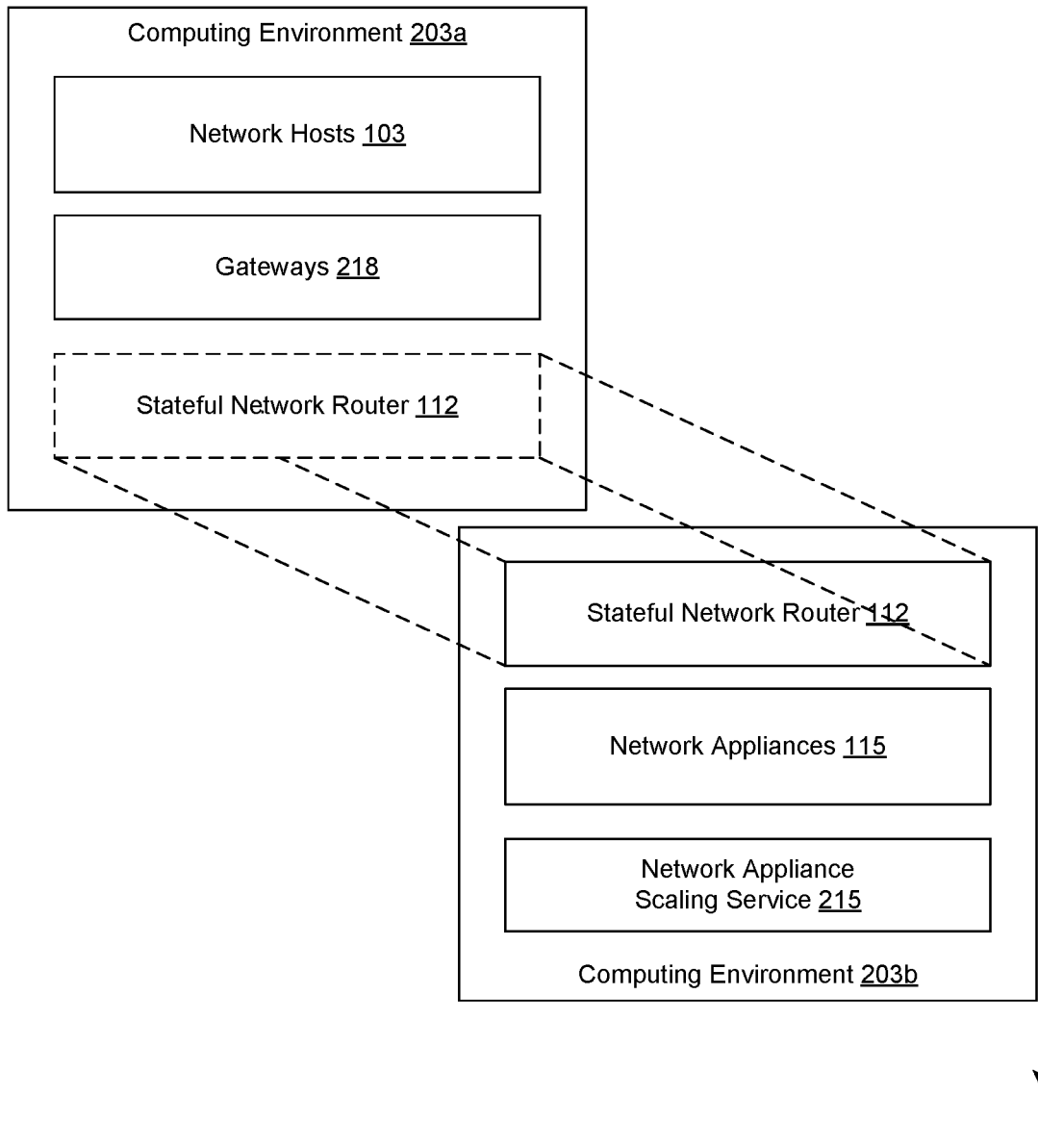

Referring next to FIG. 3, shown is another networked environment 300 illustrating an example configuration involving two computing environments 203a and 203b. The computing environments 203a and 203b may correspond to separate private networks or virtual private networks, which may be operated on behalf of different entities or users. The computing environment 203a includes network hosts 103 and gateways 218, along with a stateful network router 112, but the stateful network router 112 may be executed in the other computing environment 203b.

Nonetheless, the stateful network router 112 may be given a virtual network interface into the computing environment 203a in addition to a network interface in the computing environment 203b, which permits it to intercept network traffic within the computing environment 203a and route it to network appliances 115 in the computing environment 203b. The network appliance scaling service 215 may also be implemented in the computing environment 203b. As an alternative, the stateful network router 112 may be implemented in the computing environment 203a, while the network appliances 115 implemented in the computing environment 203b may be given virtual network interfaces in the computing environment 203a.

As a consequence, the stateful network router 112 and/or the network appliances 115 may be operated as a service by a third party that operates the computing environment 203b. Access may be provided under a utility computing model, whereby the operator of the computing environment 203a pays for metered use of the network appliances 115 and/or the stateful network router 112.

In another example, one or more network hosts 103 are also in a different computing environment 203 or network, and these network hosts 103 may be given virtual network interfaces in the computing environment 203a and/or 203b. Further, the stateful network router 112 may be given a virtual network interface into this different computing environment 203, which permits it to intercept network traffic within the different computing environment and route it to network appliances 115 in the computing environment 203b.

Figure 4:
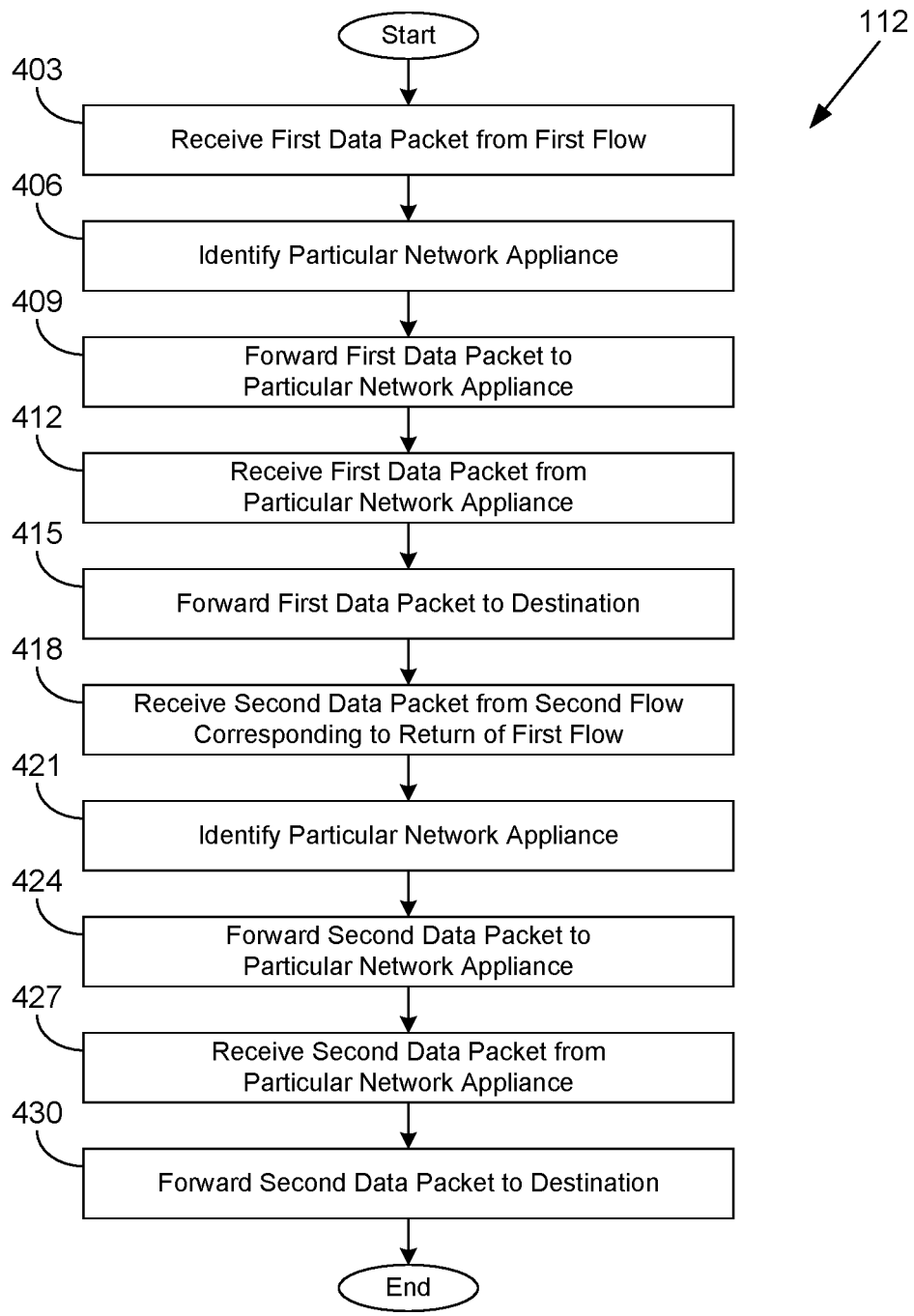
FIGS. 4 and 5 are flowcharts illustrating examples of functionality implemented as portions of a stateful network router executed in a computing environment in the networked environment of FIG. 2 or 3 according to various embodiments of the present disclosure.

Moving on to FIG. 4, shown is a flowchart that provides one example of the operation of a portion of the stateful network router 112 according to various embodiments. It is understood that the flowchart of FIG. 4 provides merely an example of the many different types of functional arrangements that may be employed to implement the operation of the portion of the stateful network router 112 as described herein. As an alternative, the flowchart of FIG. 4 may be viewed as depicting an example of elements of a method implemented in the computing environment 203 (FIG. 2) according to one or more embodiments.

Beginning with box 403, the stateful network router 112 receives a first data packet 109 (FIG. 1) from a first flow, which may be from one network host 103 (FIG. 2) to another network host 103, or from a gateway 218 (FIG. 2) to a network host 103, or vice versa. The stateful network router 112 may intercept the first data packet 109 using network infrastructure (e.g., routers) of the computing environment 203 that are configured to use the stateful network router 112. The first data packet 109 identifies a first source by a network address, a first destination by a network address, and potentially, a first source port for the source, a first destination port for the destination, and an indication of the protocol used (e.g., TCP or UDP). This information may be static across multiple data packets 109 in the flow, which makes it usable as identifying information for the flow.

In box 406, the stateful network router 112 identifies a particular network appliance 115 (FIG. 2) potentially from a plurality of network appliances 115 that each perform the same processing function. To this end, the stateful network router 112 may perform flow-based hashing on the identifying information of the flow to assign the flow to a network appliance 115 with an approximately even distribution. Other approaches may be used additionally or alternatively, including approaches that are based on metrics indicating load at the network appliances 115. In some cases, the stateful network router 112 may assign the flow to multiple network appliances 115 that perform separate functions, such that the processing of the first data packet 109 may be done in serially or in parallel by the multiple network appliances 115.

In box 409, the stateful network router 112 forwards the first data packet 109 to an inbound network interface of the particular network appliance 115 identified in box 406 for processing, potentially without modifying the first source or the first destination. In box 412, the stateful network router 112 may receive the first data packet 109 from an outbound network interface of the particular network appliance 115 after processing. In some cases, the network appliance 115 may either drop or modify the first data packet 109. If the first data packet 109 is dropped, no further forwarding is performed. If the first data packet 109 is modified, the modified data packet 109 is forwarded. In box 415, the stateful network router 112 forwards the first data packet 109 to the first destination without modifying the first source or the first destination.

Alternatively to boxes 412 and 415, the particular network appliance 115 may forward the first data packet 109 directly to the first destination network address without being intercepted by the stateful network router 112.

In box 418, the stateful network router 112 receives a second data packet 109 from a second flow corresponding to a return of the first flow. In this case, the second data packet 109 identifies a second source network address and a second destination network address, where the second source network address is the same as the first destination network address and the second destination network address is the same as the first source network address. In box 421, the stateful network router 112 identifies a particular network appliance 115 potentially from a plurality of network appliances 115 that each perform the same processing function. To this end, the stateful network router 112 may perform flow-based hashing on the identifying information of the second flow (or another assignment approach) to assign the second flow to a network appliance 115 with an approximately even distribution. It is noted that the stateful network router 112 assigns the second flow to the same particular network appliance 115 as the first flow, in order to keep both directions of a network data connection and other related data processed by the same particular network appliance 115.

In box 424, the stateful network router 112 forwards the second data packet 109 to an inbound network interface of the particular network appliance 115 identified in box 421 for processing, potentially without modifying the second source or the second destination. In box 427, the stateful network router 112 may receive the second data packet 109 from an outbound network interface of the particular network appliance 115 after processing. In some cases, the network appliance 115 may either drop or modify the second data packet 109. If the second data packet 109 is dropped, no further forwarding is performed. If the second data packet 109 is modified, the modified data packet 109 is forwarded. In box 430, the stateful network router 112 forwards the second data packet 109 to the second destination without modifying the second source or the second destination. Thereafter, the operation of the portion of the stateful network router 112 ends.

Alternatively to boxes 427 and 430, the particular network appliance 115 may forward the second data packet 109 directly to the second destination network address without being intercepted by the stateful network router 112.

Figure 5:
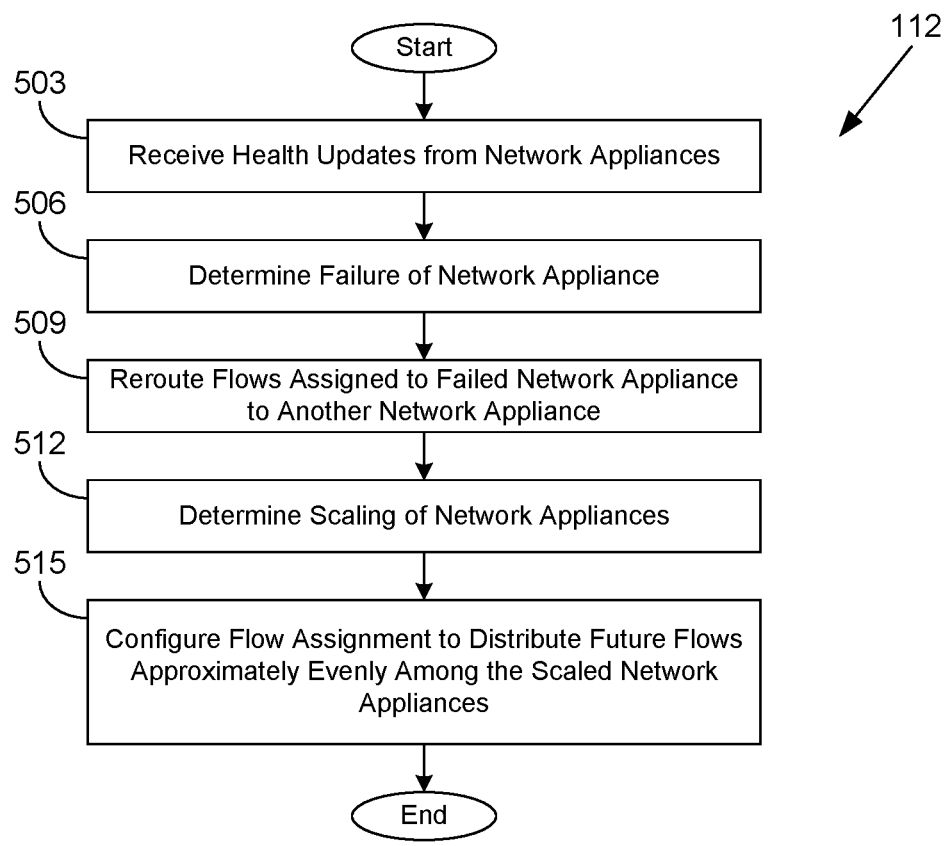

Continuing now to FIG. 5, shown is a flowchart that provides one example of the operation of another portion of the stateful network router 112 according to various embodiments. It is understood that the flowchart of FIG. 5 provides merely an example of the many different types of functional arrangements that may be employed to implement the operation of the portion of the stateful network router 112 as described herein. As an alternative, the flowchart of FIG. 5 may be viewed as depicting an example of elements of a method implemented in the computing environment 203 (FIG. 2) according to one or more embodiments.

Beginning with box 503, the stateful network router 112 receives health updates from individual network appliances 115 (FIG. 2). In box 506, the stateful network router 112 determines that a failure of a network appliance 115 has occurred. This may be determined based at least in part on the health updates, or alternatively, a lack of response from the network appliance 115. In box 509, the stateful network router 112 reroutes flows that were assigned to the network appliance 115 that failed to one or more other network appliances 115. In this way, connections or flows that traversed the failed network appliance 115 may still be maintained in spite of the failure.

In box 512, the stateful network router 112 determines that a scaling of a quantity of the network appliances 115 has occurred. The scaling may increase or decrease the number of network appliances 115. The scaling may be directed by the network appliance scaling service 215 (FIG. 2).

In box 515, in response to the scaling, the stateful network router 112 configures flow assignments to distribute future flows approximately evenly among the scaled up or scaled down quantity of network appliances 115. In the case of scaling up, the stateful network router 112 may choose to maintain an existing assignment of a flow to a previously operating network appliance 115 so that the flow or its processing by the network appliance 115 is not disrupted, even if the flow-based hashing would have assigned the flow to a different network appliance 115. In the case of scaling down, the stateful network router 112 may choose to keep a network appliance 115 operating, despite a pending deallocation, in order to service a flow that is currently traversing the network appliance 115. However, the stateful network router 112 may adjust the flow-based hashing approach to assign future flows differently, thus avoiding the network appliance 115 that is to be deallocated. The network appliance 115 can thus be deallocated in response to no data being processed through it, or if only data below a threshold is processed through it. Thereafter, the operation of the other portion of the stateful network router 112 ends.

Although FIG. 5 encompasses both rerouting in response to a failure (boxes 503-509) and configuring flow assignment responsive to scaling (boxes 512-515), it is understood that these may be implemented as separate and/or distinct processes that can occur independently or in any order.

Figure 6:
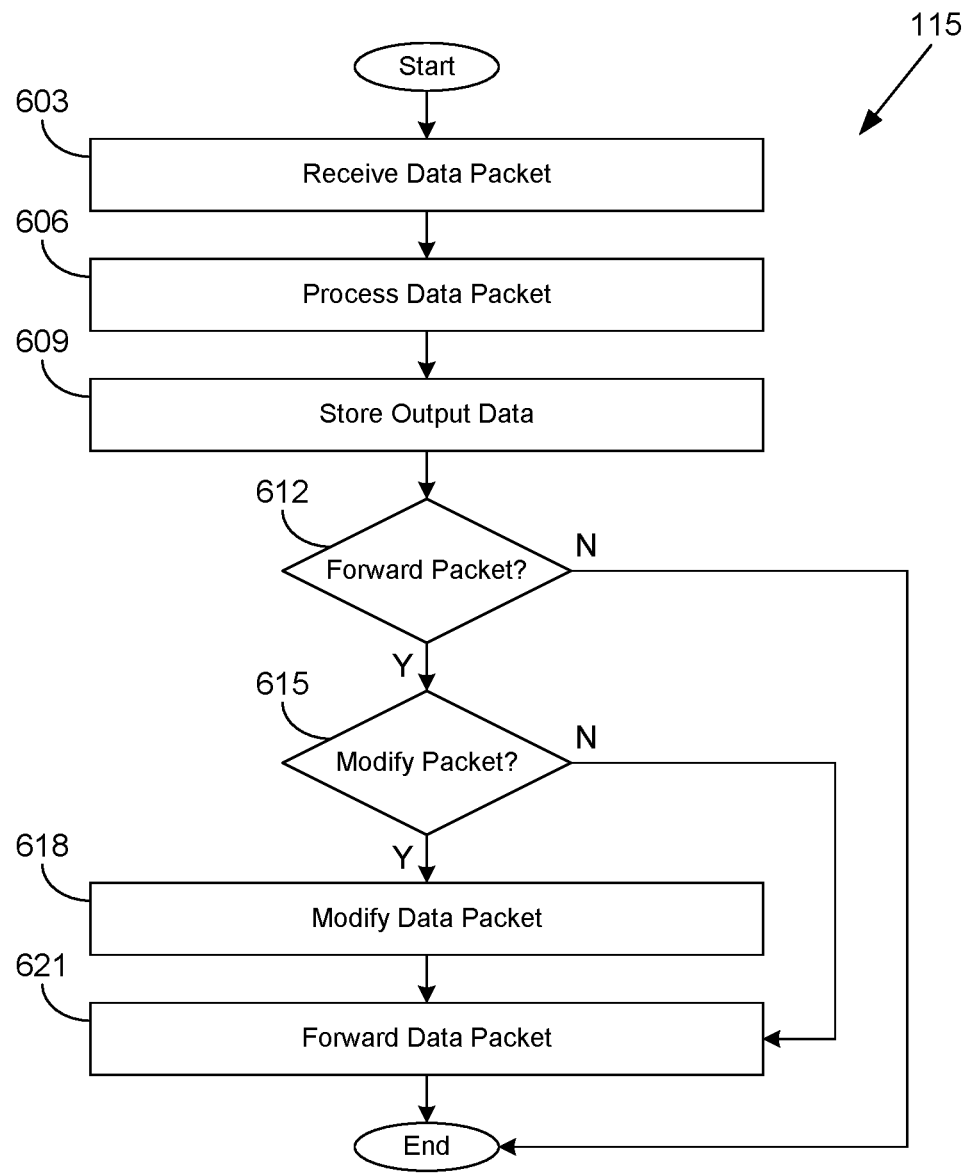
FIG. 6 is a flowchart illustrating one example of functionality implemented as portions of a network appliance executed in a computing environment in the networked environment of FIG. 2 or 3 according to various embodiments of the present disclosure.

Referring next to FIG. 6, shown is a flowchart that provides one example of the operation of a portion of the network appliance 115 according to various embodiments. It is understood that the flowchart of FIG. 6 provides merely an example of the many different types of functional arrangements that may be employed to implement the operation of the portion of the network appliance 115 as described herein. As an alternative, the flowchart of FIG. 6 may be viewed as depicting an example of elements of a method implemented in the computing environment 203 (FIG. 2) according to one or more embodiments.

Beginning with box 603, the network appliance 115 receives a data packet 109 (FIG. 1) from a stateful network router 112 (FIG. 2) via an inbound network interface. In box 606, the network appliance 115 processes the data packet 109 according to a particular processing function performed by the network appliance 115. In box 609, the network appliance 115 stores network appliance output data 230 (FIG. 2) resulting from the processing, if applicable.

In box 612, the network appliance 115 determines whether the data packet 109 is to be forwarded. If the data packet 109 is to be forwarded, the network appliance 115 moves to box 615. If the data packet 109 instead is to be dropped, the operation of the portion of the network appliance 115 ends.

In box 615, the network appliance 115 determines whether to modify the data packet 109. If the network appliance 115 determines to modify the data packet 109, the network appliance 115 proceeds to box 618 and modifies the data packet 109. The network appliance 115 then moves to box 621. If the network appliance 115 determines that the data packet 109 is not to be modified, the network appliance 115 also moves to box 621.

In box 621, the network appliance 115 forwards the data packet 109 to the stateful network router 112 or directly to the destination network address via an outbound network interface. Thereafter, the operation of the portion of the network appliance 115 ends.

Figure 7:
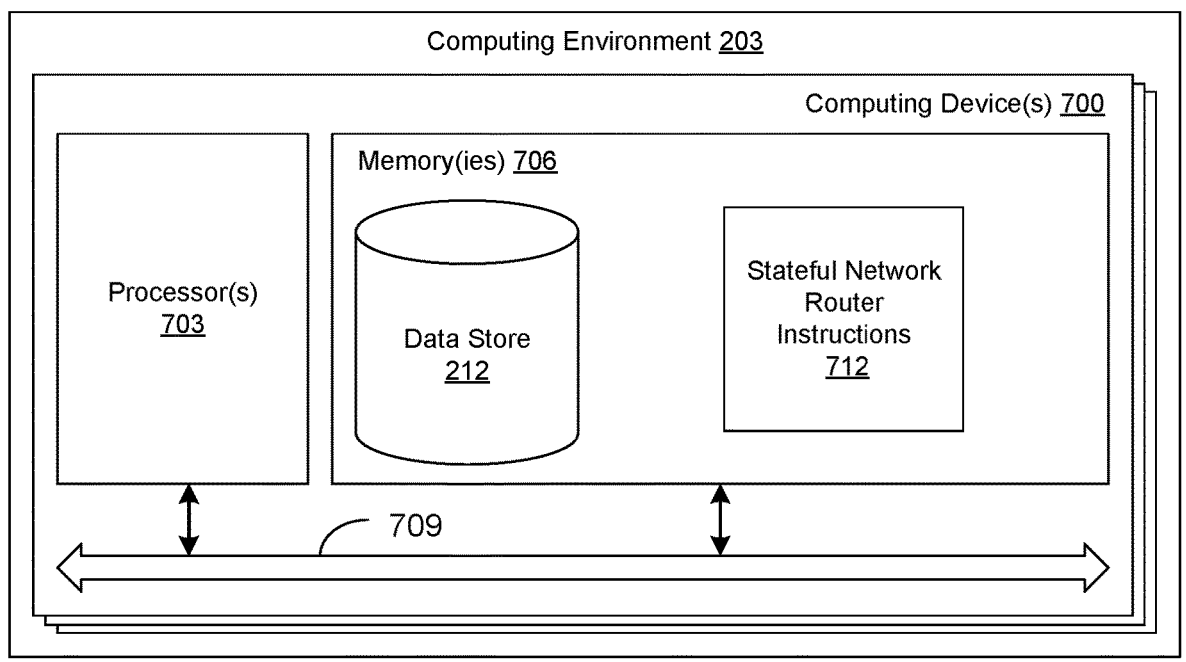
FIG. 7 is a schematic block diagram that provides one example illustration of a computing environment employed in the networked environment of FIG. 2 or 3 according to various embodiments of the present disclosure.

With reference to FIG. 7, shown is a schematic block diagram of the computing environment 203 according to an embodiment of the present disclosure. The computing environment 203 includes one or more computing devices 700, which may correspond to stateful network routers 112 (FIG. 1). Each computing device 700 includes at least one processor circuit, for example, having a processor 703 and a memory 706, both of which are coupled to a local interface 709. To this end, each computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the stateful network router instructions 712 and potentially other applications. Also stored in the memory 706 may be a data store 212 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the stateful network router 112, the network appliances 115, the network appliance scaling service 215, the network hosts 103, the gateways 218, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4-6 show the functionality and operation of an implementation of portions of the stateful network router 112 and a network appliance 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 4-6 show a specific order of execution, it is understood that the order of execution may differ from that which is depicted. For example, the order of execution of two or more blocks may be scrambled relative to the order shown. Also, two or more blocks shown in succession in FIGS. 4-6 may be executed concurrently or with partial concurrence. Further, in some embodiments, one or more of the blocks shown in FIGS. 4-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the stateful network router 112, the network appliances 115, the network appliance scaling service 215, the network hosts 103, and the gateways 218, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the stateful network router 112, the network appliances 115, the network appliance scaling service 215, the network hosts 103, and the gateways 218, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 700, or in multiple computing devices 700 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   a network comprising at least one gateway and at least one machine instance;
   a plurality of network appliances;
   a stateful network router that enables scaling and balancing of the plurality of network appliances by transparently intercepting traffic from network hosts that are within at least one predetermined subnet using at least one virtual network interface within the network, and transparently routing data to and from the plurality of network appliances, wherein inbound traffic flows from the at least one gateway to the at least one machine instance are distributed by the stateful network router among individual network appliances of the plurality of network appliances, and outbound traffic flows from the at least one machine instance to the at least one gateway are distributed by the stateful network router to respective network appliances of the plurality of network appliances that processed the inbound traffic flows corresponding to the outbound traffic flows; and
   a network appliance scaling service executed in at least one computing device, the network appliance scaling service configured to at least:
   receive network utilization metrics from the network;
   receive utilization information from the plurality of network appliances; and
   dynamically scale a quantity of the plurality of network appliances including respective inbound network interfaces and respective outbound network interfaces corresponding to respective ones of the network appliances allocated to provide networking functionality to receive, process, and forward data packets in the network, wherein the quantity is scaled based at least in part on at least one of: the network utilization metrics or the utilization information.

2. The system of claim 1, wherein upon detecting a failure in a first one of the plurality of network appliances, the stateful network router is configured to redistribute the inbound and outbound traffic flows previously handled by the first one of the plurality of network appliances to one or more others of the plurality of network appliances.

3. The system of claim 1, wherein upon detecting an additional network appliance in the plurality of network appliances, the stateful network router is configured to maintain existing assignments of the inbound and outbound traffic flows within the plurality of network appliances.

4. The system of claim 1, wherein the stateful network router performs flow-based hashing to approximately evenly assign the inbound traffic flows to the individual network appliances.

5. The system of claim 1, wherein the network corresponds to a first network, and the plurality of network appliances are on a second network.

6. The system of claim 1, wherein the plurality of network appliances are operated within one or more of the at least one machine instance on the network.

7. The system of claim 1, wherein the stateful network router is configured to perform system health checks on the individual network appliances.

8. The system of claim 1, wherein the plurality of network appliances are on a different network, and the plurality of network appliances are operated by a third party as a service to an entity operating the network under a utility computing model.

9. The system of claim 1, wherein the plurality of network appliances are configured to perform at least one of: a filtering function, a logging function, an analytical function, or an anti-virus function.

10. A computer-implemented method, comprising:
    transparently intercepting, by a stateful network router, a first data packet identifying a first source and a first destination, wherein a particular subnet comprises the first source;
    identifying a particular network appliance from a plurality of network appliances based at least in part on the first data packet;
    forwarding, by the stateful network router, the first data packet to the particular network appliance for processing without modifying the first source or the first destination;
    receiving, by the stateful network router, a second data packet identifying a second source and a second destination, the second source being the first destination, and the second destination being the first source;
    identifying the particular network appliance based at least in part on the second data packet;
    forwarding, by the stateful network router, the second data packet to the particular network appliance for processing without modifying the second source or the second destination, wherein the stateful network router enables scaling and balancing of the plurality of network appliances by transparently intercepting traffic from the particular subnet and transparently routing the first data packet and the second data packet;
    receiving network utilization metrics;
    receiving network appliance utilization information; and
    dynamically scaling a quantity of the plurality of network appliances including respective inbound network interfaces and respective outbound network interfaces corresponding to respective ones of the network appliances that receive, process, and forward data packets, wherein scaling is based at least in part on at least one of: the network utilization metrics or the network appliance utilization information.

11. The computer-implemented method of claim 10, further comprising:

receiving the first data packet from the particular network appliance;

forwarding the first data packet to the first destination without modifying the first source or the first destination;

receiving the second data packet from the particular network appliance; and forwarding the second data packet to the second destination without modifying the second source or the second destination.

12. The computer-implemented method of claim 10, wherein identifying the particular network appliance from the plurality of network appliances based at least in part on the first data packet further comprises applying flow-based hashing on header information of the first data packet to select the particular network appliance.

13. The computer-implemented method of claim 10, further comprising:

receiving a third data packet identifying a third source and a third destination;

identifying a different network appliance from the plurality of network appliances based at least in part on the third data packet;

forwarding the third data packet to the different network appliance for processing without modifying the third source or the third destination;

receiving a fourth data packet identifying a fourth source and a fourth destination, the fourth source being the third destination, and the fourth destination being the third source;

identifying the different network appliance based at least in part on the fourth data packet; and forwarding the fourth data packet to the different network appliance for processing without modifying the fourth source or the fourth destination.

14. The computer-implemented method of claim 10, wherein receiving the first data packet further comprises receiving the first data packet from a first network, forwarding the first data packet to the particular network appliance comprises forwarding the first data packet to the particular network appliance on a second network, receiving the second data packet comprises receiving the second data packet from the first network, and forwarding the second data packet to the particular network appliance further comprises forwarding the second data packet to the particular network appliance on the second network.

15. The computer-implemented method of claim 10, further comprising:

determining a level of network traffic processed by the plurality of network appliances and a capacity of the plurality of network appliances; and increasing or decreasing the quantity of the plurality of network appliances based at least in part on the level of network traffic and the capacity.

16. The computer-implemented method of claim 10, wherein individual ones of the network appliances do not exchange flow state information.

17. A system, comprising:

at least one computing device configured to at least:

intercept, by a stateful network router, a network data connection between a first host and a second host on a network;

transparently route, by the stateful network router, first data packets from the network data connection sent by the first host to the second host to a target network appliance of a plurality of network appliances;

transparently route second data packets from the network data connection sent by the second host to the first host to the target network appliance, wherein the stateful network router enables scaling and balancing of the plurality of network appliances by intercepting traffic from a subnet comprising the first host and transparently routing the first data packets and the second data packets;

receive network utilization metrics for the network;

receive utilization information for the plurality of network appliances; and dynamically scale a quantity of the plurality of network appliances including respective inbound network interfaces and respective outbound network interfaces corresponding to respective ones of the network appliances allocated to receive, process and forward data packets comprising the first data packets and the second data packets in the network, wherein the quantity is scaled based at least in part on at least one of: the network utilization metrics or the utilization information.

18. The system of claim 17, wherein the at least one computing device is further configured to at least identify the target network appliance from the plurality of network appliances based at least on identifying information for the network data connection.

19. The system of claim 17, wherein the at least one computing device is further configured to at least:

forward the first data packets that have been processed by the target network appliance to the second host; and forward the second data packets that have been processed by the target network appliance to the first host.

20. The system of claim 17, wherein the at least one computing device is further configured to at least intercept all data exchanged between all hosts on the network.

* * * * *